J. S. FOWLER.
Harvester Rake.
No. 88,156.
Patented March 23, 1869.
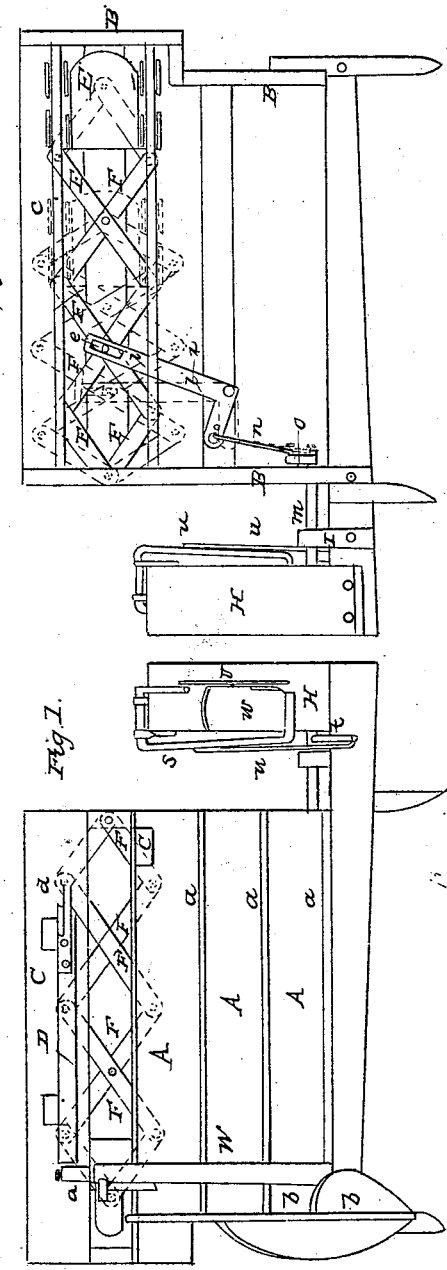
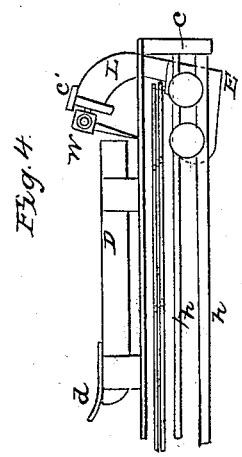
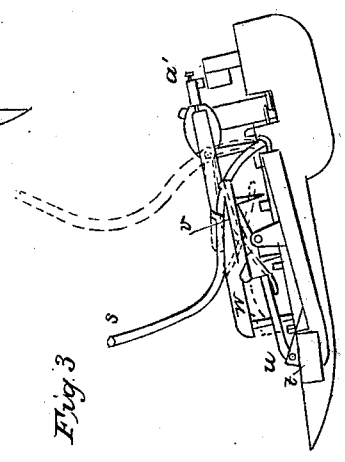
Witnesses.
James P Groves
John Hegenson
Inventor
J. S. Fowler
Chapman Horner & Co
attys

UNITED STATES PATENT OFFICE.

JAMES S. FOWLER, OF DAVENPORT, IOWA.

IMPROVEMENT IN HARVESTER-RAKES.

Specification forming part of Letters Patent No. 88,156, dated March 23, 1869.

*To all whom it may concern:*

Be it known that I, JAMES S. FOWLER, of Davenport, in the county of Scott and State of Iowa, have invented a new and valuable Improvement in Self-Raker Attachment for Reapers; and I do hereby declare that following is a full, clear, and exact description of the construction and operation of the same, reference being had to the annexed drawings, making a part of this specification, and to the letters and figures of reference marked thereon.

Figure 1 of the drawings is a plan view of my device. Fig. 2 is a plan view of the under side of the same. Figs. 3 and 4 are details.

My invention relates to devices for raking grain into bundles immediately after it has been cut by a reaper; and it consists in constructing and attaching to a reaper novel devices, by which the operator is enabled to rake the grain into bundles upon a platform contiguous to the reaper, either by the hand or foot, thereby relieving the draft upon the team which is necessarily connected with the raking process when conducted by the power that moves the reaper.

The letter A of the drawings represents a platform, which I attach to the side of a reaper, immediately in the rear thereof, and adjust it in such manner that the grain, when cut, shall first fall upon said platform. The letters $a$ represent slats nailed on the upper surface of the platform to receive the grain as it falls; and letter $b$ is a guard and guide, adjusted to prevent the grain from falling over the end of the platform and guide it upon the slats above mentioned. I also place a small block, constructed in the form of a wedge, at the point marked $c$ on the drawings, the thin end of which is pointed inward on the platform.

At each end of the platform, and attached to the under side thereof, I affix beams or supports, (marked B,) upon the extreme rear ends of which I attach the plank C. The letter D represents a frame raised upon the plank C, to the inner end of which I affix a spring, $d$, in the manner represented.

On the under side of the platform A and plank C, I attach four parallel rods, $h$, the ends of which respectively rest in the beams B. These rods are adjusted in such manner that two of them serve as a track and guide for car-wheels below the platform, while the other two serve the same purpose underneath the plank C.

I adjust a railway-car, E, upon the track formed as above mentioned, and arrange it thereon in such manner that it may be moved back and forth at will by the means hereinafter mentioned.

The letter F represents a series of levers, pivoted together at their respective ends and centers, in the manner shown. They are attached by the end levers to the railway-car and the inner beam, B, respectively, and form a chain corresponding in length to the distance of said railway-car from said inner beam.

The letter $i$ is a slotted elbow-lever, attached by its slot to a pin, $e$, that passes through the centers of two of the levers F, as shown in Fig. 2. It is pivoted at its elbow to the bottom of the platform, or to a beam fastened thereto, and is united to the rod $n$, as shown. The rod $n$ extends from the elbow-lever $i$ to the crank $o$, which said crank is connected with the shaft $m$, in the manner shown on Fig. 2. The shaft $m$ is supported by and operates in bearings formed in inner beam B, and an arm, $r$, attached to the extended part of the platform at the point shown. The shaft $m$ has affixed to its outer end an arm, $t$, turned at right angles therewith, that serves the purpose of a crank, at the extreme upper end of which I attach the rod $u$. This rod extends from the arm last above mentioned to a point near the center of the upright portion of the lever $s$, next mentioned, and it is pivoted to said arm and lever, respectively.

The lever $s$ is constructed in the form shown on the drawings. It is connected with the standing board or platform H by staples in the rear end thereof, and with the rod $v$, in manner represented, The letter $w$ is a treadle, hinged or pivoted to the top of a small frame, adjusted on the platform H. It is adapted to receive the foot of the operator, and be trodden either forward or backward at will. The rod $v$ connects this treadle with the lever $s$, in the manner shown on the drawings.

The above-described devices, except the platform A and its guard, are designed for the purpose of moving a rake back and forth upon said platform, the method of which movement will be readily understood when I specify the manner in which such rake is attached to the machinery.

The letter L of the drawings represents a circular arm attached to the railwar-car E; and the letter W is the rake, pivoted to the end of said arm, in the manner shown on Fig. 4.

The letter $a'$ is a small roller, revolving on a pin attached to the end of the rake. I also place a small guard, $c'$, on the end of the arm L, to aid in the movements of the rake.

My device is operated as follows, viz: When the grain is cut by the reaper it falls on the platform A, and the end in view is to rake it from said platform to the open space between platforms A and H, when it falls to the ground, ready to be bound into bundles. To accomplish this object the operator takes hold of the end of lever $s$ or places a foot upon treadle $w$, as he may desire, thereby moving said lever, and with it the railway-car and rake back and forth. When the rake is drawn forward it deposits the grain upon the ground after the roller $a'$ has passed over the spring $d$. Now, when I reverse the lever to return the rake to the farther end of the platform, the roller $a'$ is caught on the under side of the spring $d$, which guides it below the frame D, thereby raising the rake from the platform and keeping it suspended until it has passed the end of said frame. When the last-named point is reached the roller is released and the rake is returned to its platform, ready to repeat the operation of raking.

What I claim as my invention, and desire to secure by Letters Patent, is—

The devices herein described for operating the rake by hand and foot, consisting, mainly, of the treadle $w$, levers $s$ and $i$, shaft $m$, rods $u$, $v$, and $n$, arms $o$ and $t$, jointed levers F, car E, with its track and arm, connected with the rake as described, when constructed, combined, and operating substantially as and for the purposes specified.

In testimony that I claim the above I have hereunto subscribed my name in the presence of two witnesses.

J. S. FOWLER.

Witnesses:
C. WHITAKER,
W. J. BIRCHARD.